United States Patent
Kenmochi

(10) Patent No.: US 7,705,259 B2
(45) Date of Patent: Apr. 27, 2010

(54) THIN KEY SHEET AND THIN KEY UNIT INCORPORATING THE THIN KEY SHEET

(75) Inventor: Yoshio Kenmochi, Tokyo (JP)

(73) Assignee: Sunarrow Limited, Tokyo (JP)

( * ) Notice: Subject to any disclaimer, the term of this patent is extended or adjusted under 35 U.S.C. 154(b) by 150 days.

(21) Appl. No.: 11/793,972

(22) PCT Filed: Dec. 28, 2005

(86) PCT No.: PCT/JP2005/024024

§ 371 (c)(1),
(2), (4) Date: Jun. 25, 2007

(87) PCT Pub. No.: WO2006/070854

PCT Pub. Date: Jul. 6, 2006

(65) Prior Publication Data

US 2008/0073186 A1    Mar. 27, 2008

(30) Foreign Application Priority Data

Dec. 28, 2004 (JP) .............................. 2004-378678
Jan. 25, 2005 (JP) .............................. 2005-016253

(51) Int. Cl.
*H01H 9/00* (2006.01)
(52) U.S. Cl. ........................................ 200/514; 200/5 A
(58) Field of Classification Search ......... 200/310–314, 200/341–345, 512–520
See application file for complete search history.

(56) References Cited

U.S. PATENT DOCUMENTS

| 5,945,463 | A | 8/1999 | Kawabuchi et al. ........... 522/96 |
|---|---|---|---|
| 7,034,232 | B2 * | 4/2006 | Ide et al. ..................... 200/5 A |
| 7,187,306 | B2 * | 3/2007 | Makino et al. ................ 341/21 |
| 7,244,898 | B2 * | 7/2007 | Kim ........................... 200/314 |
| 7,249,861 | B2 * | 7/2007 | Coleman et al. .............. 362/24 |
| 7,253,369 | B2 * | 8/2007 | Fu et al. ..................... 200/310 |
| 7,273,993 | B1 * | 9/2007 | Tanner et al. ............... 200/314 |
| 7,378,607 | B2 * | 5/2008 | Koyano et al. .............. 200/341 |
| 7,411,143 | B2 * | 8/2008 | Shin et al. .................. 200/314 |
| 7,432,464 | B2 * | 10/2008 | Chiu et al. .................. 200/310 |
| 7,465,889 | B2 * | 12/2008 | Nakajima et al. ........... 200/5 A |
| 7,485,822 | B2 * | 2/2009 | Koyano et al. .............. 200/341 |
| 7,488,910 | B2 * | 2/2009 | Hong ......................... 200/310 |
| 7,511,701 | B2 * | 3/2009 | Nuovo ....................... 345/169 |

FOREIGN PATENT DOCUMENTS

| CN | 1051563 | 4/2000 |
|---|---|---|
| JP | 11-329149 | 11/1999 |
| JP | 2002-050258 | 2/2002 |
| JP | 2004-079339 | 3/2004 |

(Continued)

*Primary Examiner*—Renee S Leubke
*Assistant Examiner*—Lisa Klaus
(74) *Attorney, Agent, or Firm*—Westman, Champlin & Kelly, P.A.

(57) ABSTRACT

Mobile phones are in a trend of having thinner configuration due to emphasis on the design. Thus, in order to meet this demand, the present invention aims to thin the key sheet portion as much as possible. A thin key sheet and a thin key unit incorporating the thin key sheet are configured by providing on its surface a key top 2 made of a metal or a resin with indications such as letters, symbols, graphics or the like indicating the functions of keys are formed on the front surface or the back surface thereof, and switch elements 4 for turning ON/OFF of an electric circuit by the pressing of the key top, together with a printed circuit board 5 on which a circuit pattern involved therewith is formed; and by adhering and fixing the key top 2 and the printed circuit board 5 together via a cushion gasket 3 having appropriate elasticity and a filler layer 14 disposed between the key top and the printed circuit board.

16 Claims, 15 Drawing Sheets

FOREIGN PATENT DOCUMENTS

| | | |
|---|---|---|
| JP | 2004-193060 | 7/2004 |
| KR | 10-0235841 | 9/1999 |
| SG | 39802 | 2/2003 |
| WO | WO 96/10594 | 4/1996 |

\* cited by examiner (a)

(b)

(a)

(b)

THIN KEY SHEET AND THIN KEY UNIT INCORPORATING THE THIN KEY SHEET

CROSS-REFERENCE TO RELATED APPLICATION

The present application is a 35 U.S.C. §371 National Stage Application of, and claims priority of, International patent application Serial No. PCT/JP2005/024024 filed Dec. 28, 2005, now Publication No. WO 2006/070854, published Jul. 6, 2006, and published in Japanese, not in English, the content of which is hereby incorporated by reference in its entirety.

TECHNICAL FIELD

The present invention relates to a key sheet on which a plurality of keys working as input means for handy mobile equipments such as portable phones, personal digital assistants (PDA) or the like are assembled and disposed, and also relates to a technology for thinning a key unit with the key sheet being incorporated.

BACKGROUND ART

A key sheet is a component constituting a handy mobile equipment such as a portable phone, personal digital assistant (PDA) or the like, and a plurality of key tops working as push buttons each indicating an alphabetical and/or numerical key or a function key are adhered in an arrayed manner to the surface of a single sheet referred to as a key pad. The above-mentioned key pad is a flexible sheet having rubber elasticity such as a silicone rubber, thermoplastic elastomer or the like. On the undersurface of the key sheet thus configured, a printed circuit board provided with a plurality of normally open contacts closed by pressing a push button is closely disposed, so that push button switches are formed, and further a light source for illuminating a key top from the back surface is disposed.

Since the key sheet is thus configured in a state where a plurality of components are piled up in a layered manner, the thicknesses of each one of components are accumulated to have substantial thickness. Therefore, it is requested that the whole handy mobile equipment should be thinned as much as possible so as to further enhance the portability thereof.

However, for example in the method disclosed in Patent Publication 1, each component to be piled up has a conventional common configuration, which puts a structural limit on further thinner configuration. Moreover, there is a limit for the thinning of a key sheet only by using an EL sheet which is thinner than an LED as a light source.

Patent Reference 1
Japanese Laid-Open Patent [Kokai] Publication No. 2002-050258

DISCLOSURE OF THE INVENTION

Problems to be Solved by the Invention

Portable phones are in a trend of having thinner configuration due to emphasis on the design. Along with this trend, it is requested that the thickness of a key sheet should be thinned to about 1.0 mm. However, as long as the prior art is followed, there is a limit for the thinning of a key sheet. The limit was 1.5 to 1.6 mm.

Although a light source for illuminating a key top from the back surface is small, it is a three-dimensional structure having a dimension of length, width and height like a smaller bean, and in particular its height hampers thinner configuration.

When thinning a key top made of resin, 0.6 mm would be a limit in order to gain necessary strength. Further, when using an LED (light-emitting diode) as a light source, it is necessary to provide a key pad with an LED housing part. The housing part needs the thickness of at least 0.6 mm, and it is necessary to secure an operation part with 0.3 mm for ensuring key strokes, so that it is impossible to set the thickness of the key pad to 0.9 mm or less.

In consideration of such current situation, the objects to be achieved by the present invention are: to reduce the number of the accumulation of each independent component of the key unit part; and to limit the height of a light source, which is one of the causes for hampering thinner configuration, for illuminating a key top from the back surface and, in order to thin the thickness thereof as much as possible so as to further enhance the portability of a handy mobile equipment; as well as to enhance waterproof property for daily use and dustproof property.

Problems to be Solved by the Invention

As one means for achieving the above-mentioned objects, cushion gaskets having appropriate elasticity are used instead of using a key pad which has been formed of a silicone rubber or a thermoplastic elastomer. When a key top is made of a resin, the thickness thereof is limited to 0.6 mm; or when a key top is made of a metal plate such as stainless steel, the thickness thereof is limited to 0.1 to 0.3 mm. When a key top is made of a metal, openings such as letters or the like may be perforated by means of laser etching or chemical etching in order to obtain an illumination type key top. However, when the openings are thus perforated, waterproof properties and dustproof properties need to be given to their openings and the edge of the opening needs to be designed not to injure fingers in operation. In addition, it is desirable to give an overall waterproof property for daily use.

Further, an attention is paid to a light source for illuminating a key top from the back surface, which hampers thinner configuration. An EL-integrated thin key sheet is configured by using, instead of a conventional three-dimensional light source such as LED or the like, a thin film EL (electroluminescence) element which can reduce the thickness (height) by a large extent, and by forming the thin film EL element on the back surface of a key top by means of printing. Moreover, with regard to the wiring to the thin EL light source, further thinner configuration is achieved by forming a conduction pattern on a key pad or a key top using a film-forming method for a metal thin film such as deposition, sputtering or the like.

Effect of the Invention

1) While the limit of the thickness of a key unit according to the prior art was 1.5 to 1.6 mm, the limit was broken by carrying out the present invention, enabling thinner configuration down to 1.0 mm or less.

2) A cushion gasket having appropriate elasticity was used instead of a key pad, thereby supporting a key top such that it can be displaced up and down and fixing the key top. Therefore, one of the accumulated layers (such as an adhesive layer for fixing a key top onto the key pad) is decreased, so that further thinner configuration was achieved.

3) A foamed material or soft material was disposed below a key top, thereby achieving thinner configuration while enhancing a key click feel.

4) In addition, it is possible to measure up to the demanders' expectation of the improvement of water proof function along with the recent penetration of handy mobile equipments such as portable phones, personal digital assistants (PDA) or the like into the daily life.

BEST MODE FOR CARRYING OUT THE INVENTION

Thinner configuration of a key sheet can be achieved by the embodiment of a thinning configuration in which a key pad becomes unnecessary by disposing a spacer (cushion gasket, appropriate foamed material or soft material, or the combination thereof) between a key top and a printed circuit board; the embodiment in which a key top is configured in a single layer; and the embodiment in which the wiring to a thin EL light source is formed using a film-forming method for a metal thin film such as deposition, sputtering or the like.

In addition, a thinner configuration can be achieved while enhancing a key click feel by interposing a foamed material, that is a material having flexibility and shape restorability, such as urethane foam, or a soft material such as various soft elastomers between the back surface of the above-mentioned key top and the printed circuit board disposed therebelow. The detailed description thereof is given in the latter half of the description of Embodiment 1. Further, when using the EL sheet (EL light source arrayed in a predetermined pattern on a resin film) adhered as a light source between a key top and a circuit pattern (specifically speaking, over metal domes provided on a printed circuit board), the above-mentioned foamed material or soft material need to be transparent.

Figure 1:
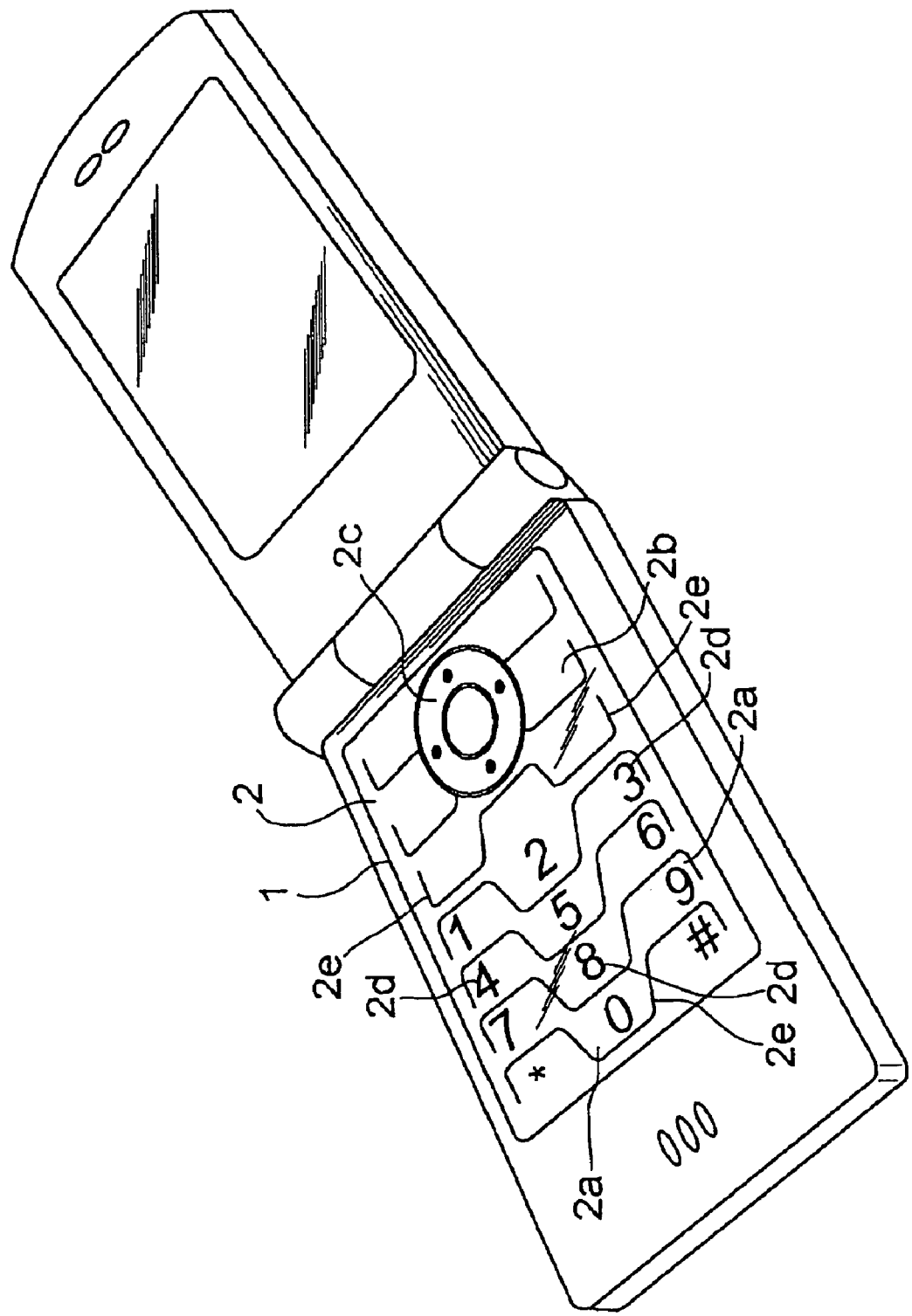
FIG. 1 is a perspective view showing the entire image of a thinned folding portable phone provided with a thin key sheet in accordance with the present invention.

The shapes of mobile phones are roughly classified into a type in which a display part and a key top part are disposed on the same surface and which has a bar shape (straight type) and into a folding type in which a hinge is disposed between a display part and a key top part so that folding is possible. The key sheet thinning according to the present invention can be applied to either type. Thus, an application example for the folding type (see FIG. 1) is shown as one embodiment.

Figure 2:
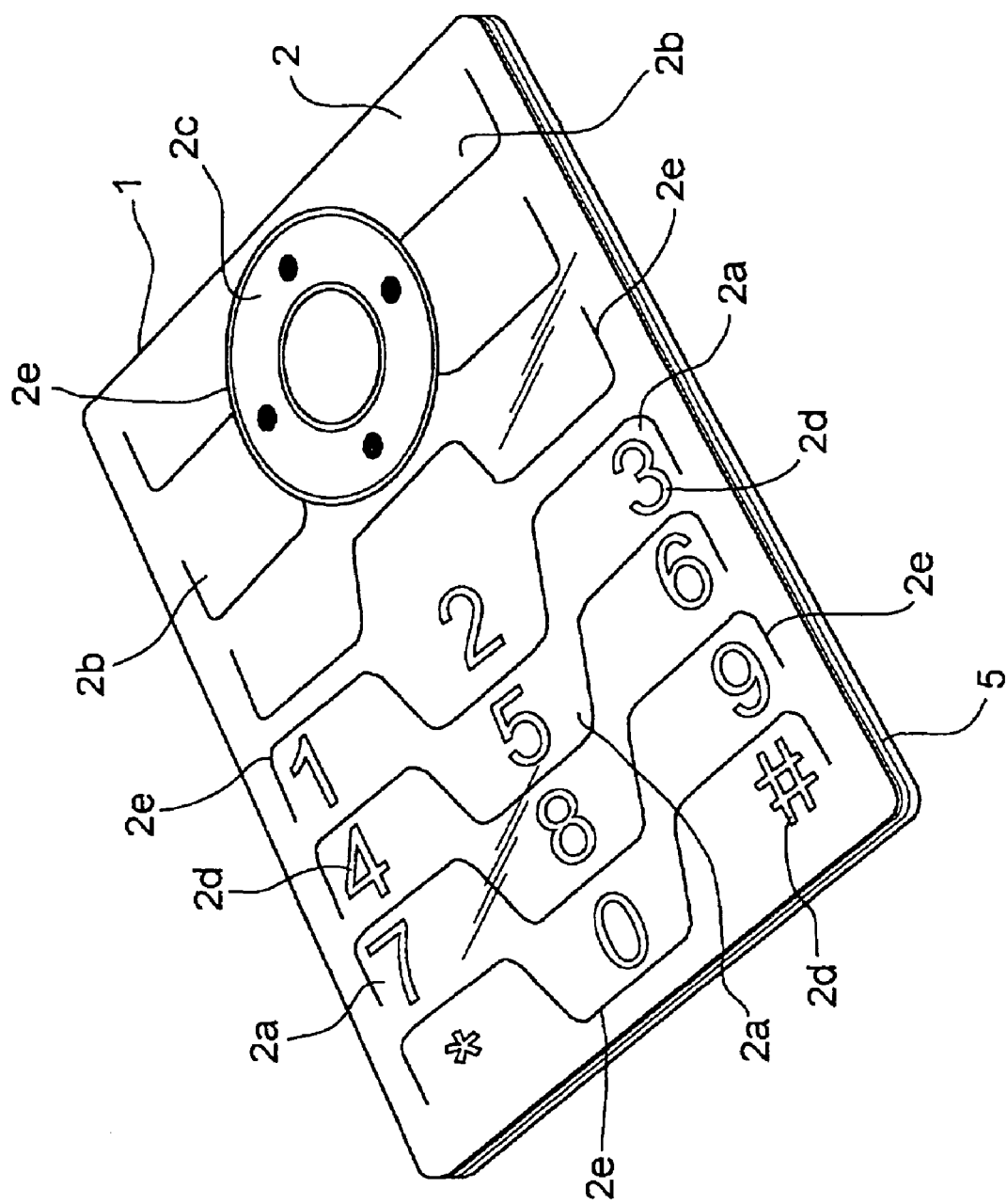
FIG. 2 is a perspective view showing the appearance of Embodiment 1 of a thin key sheet in accordance with the present invention.
Figure 7:
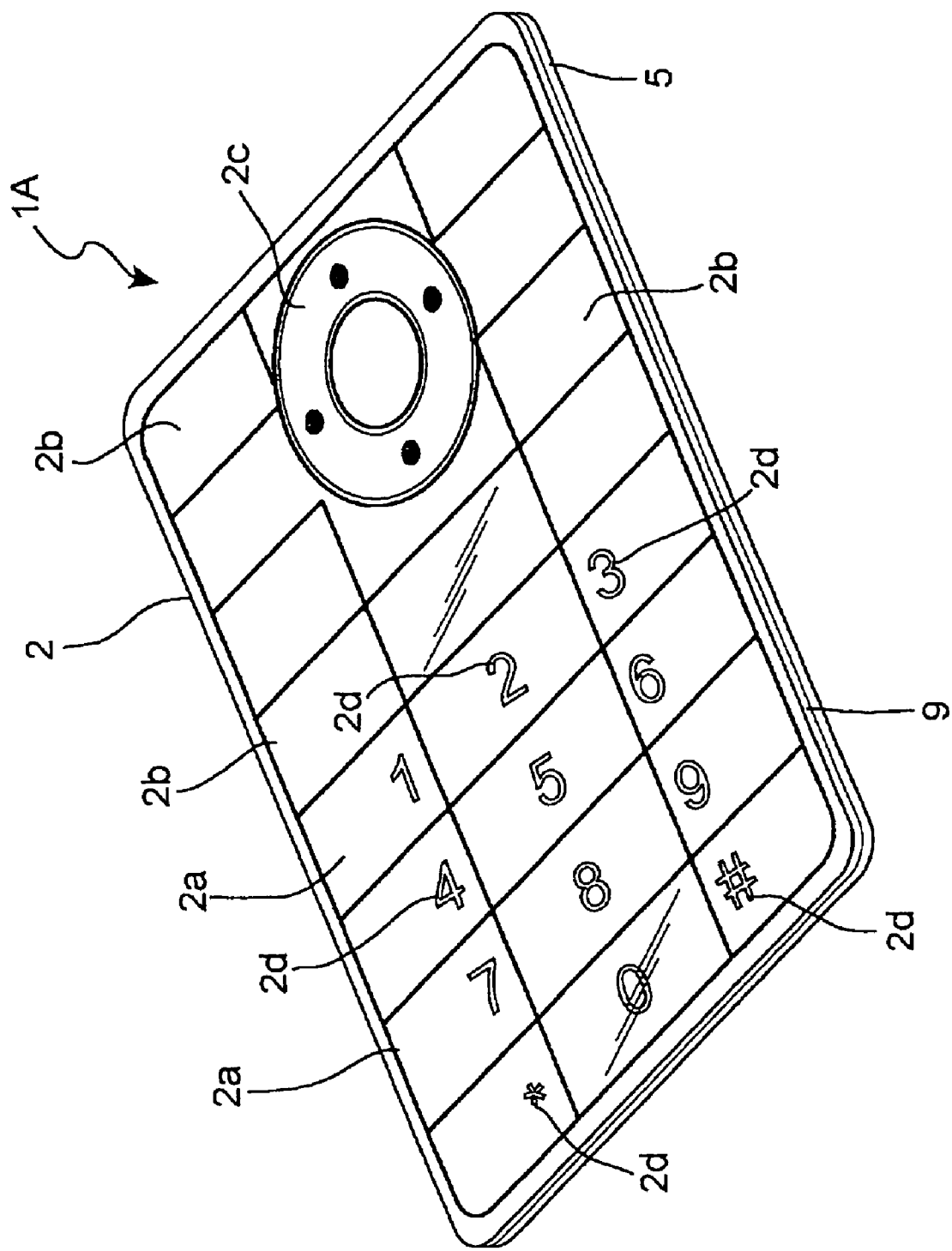
FIG. 7 is an enlarged perspective view showing the appearance of Embodiment 2 of a thin key sheet in accordance with the present invention.
Figure 9:
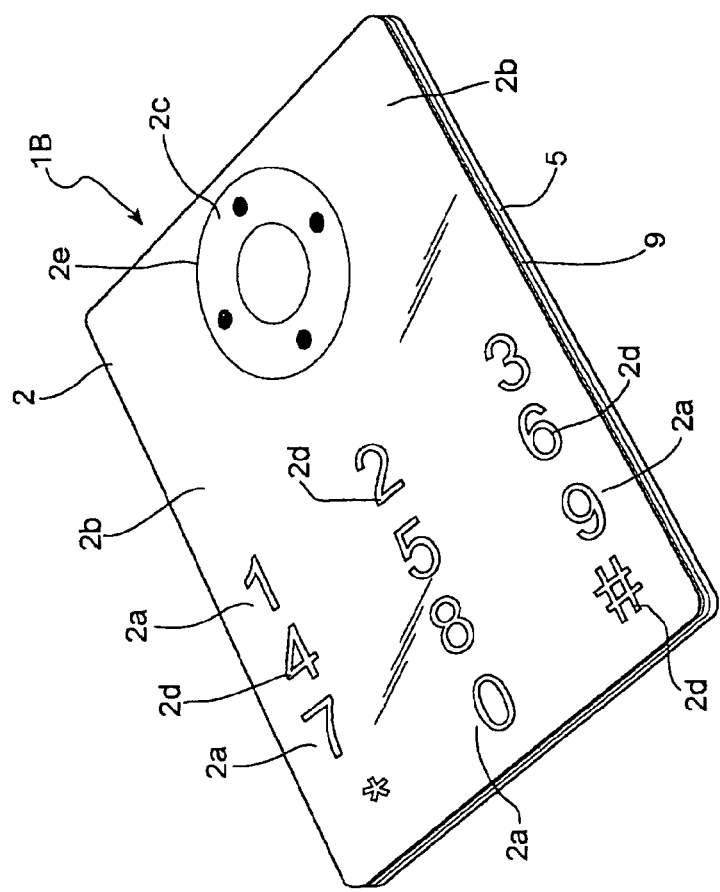
FIG. 9 is an enlarged perspective view showing the appearance of Embodiment 3 of a thin key sheet in accordance with the present invention.

As shown in FIGS. 2, 7 and 9, each of the thin key sheets (hereinafter, referred to simply as "key sheet") 1, 1A and 1B comprises: a key top 2 (or key top 2a~2d) in which a plurality of push button keys such as ten-keys 2a on which alphabets, symbols and/or numerals are indicated, function keys 2b to which the functions such as power ON/OFF, the cutting of a line, e-mail or the like are allocated, and a cursor key 2c at the upper central part are assembled to be integrally formed (FIGS. 2 and 9) or to be each separately formed (FIG. 7); and a cushion gasket 3 (hereinafter, referred to simply as "gasket") which is used instead of a key pad which is a flexible sheet made of various conventional rubbers such as a silicone rubber, a thermoplastic elastomer or the like.

On the undersurface of the key sheet 1 thus configured, a printed circuit board 5 provided with metal domes 4 or the like for electrically connecting, by means of short-circuiting, a plurality of normally open contacts closed by pressing a push button is closely disposed as a switch element, and an EL element 6 used as a light source for illuminating a key top from the back surface is disposed between the key top 2 and the printed circuit board 5, so that a key unit which is integrally modularized as illuminated push button switches is configured.

Further, while not always necessary, it is desirable that, on the back surface of the key top 2, contact pressing projections (pressing elements) 7 (see FIGS. 6, 8 and 10 to 14) are formed as projections for pressing the above-mentioned metal domes 4 for example by means of a method for supplying an appropriate liquid hard resin using a dispenser 10 (see FIG. 4), screen printing or the like on the EL element 6 (see FIGS. 6 and 10 to 14).

In the above-mentioned printed circuit board 5, wiring patterns 5a at the front/back sides are connected via a through hole 5b (see FIGS. 6, 8 and 10 to 14). The through hole 5b may be filled with conductive rubber or conductive ink 5c in order to secure the connection between the wiring patterns 5a at the front/back sides (see FIG. 10). Specific Embodiments of the present invention are listed below.

Embodiment 1

Figure 3:
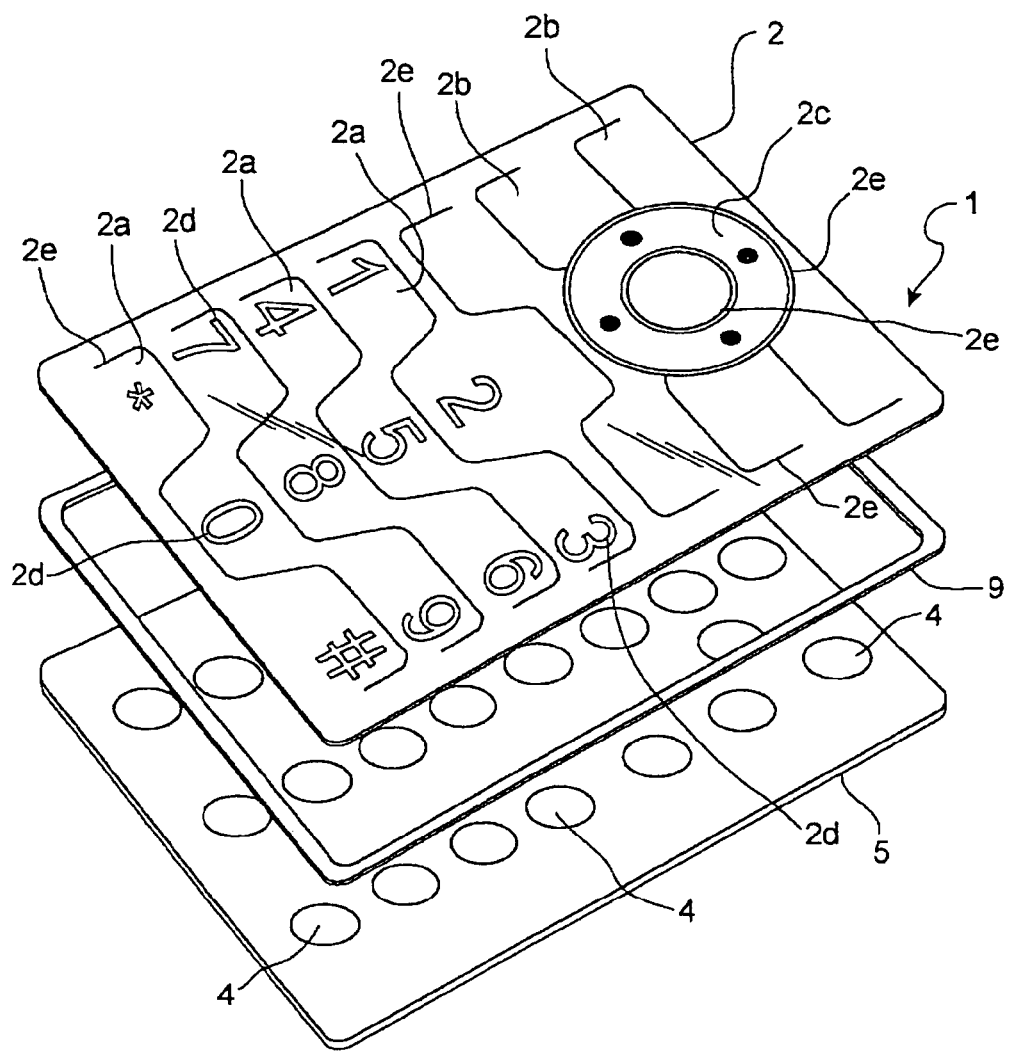
FIG. 3 is an exploded perspective view of Embodiment 1 of a thin key sheet in accordance with the present invention.
Figure 4:
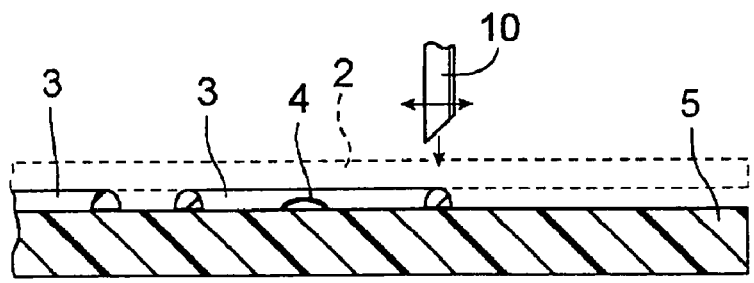
FIG. 4 is a sectional view showing the outline of a process in which cushion gaskets are attached to predetermined parts on the back surface of a key top using a dispenser, in Embodiment 1 of a thin key sheet in accordance with the present invention.
Figure 4:
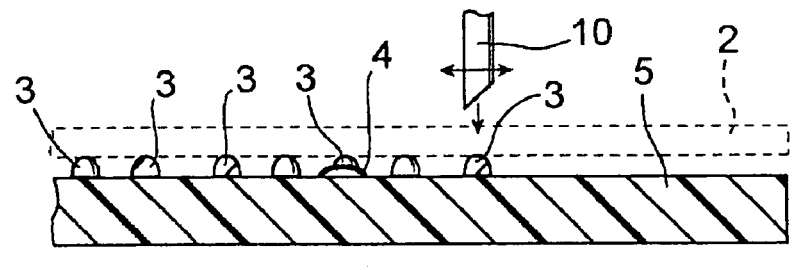
Figure 5:
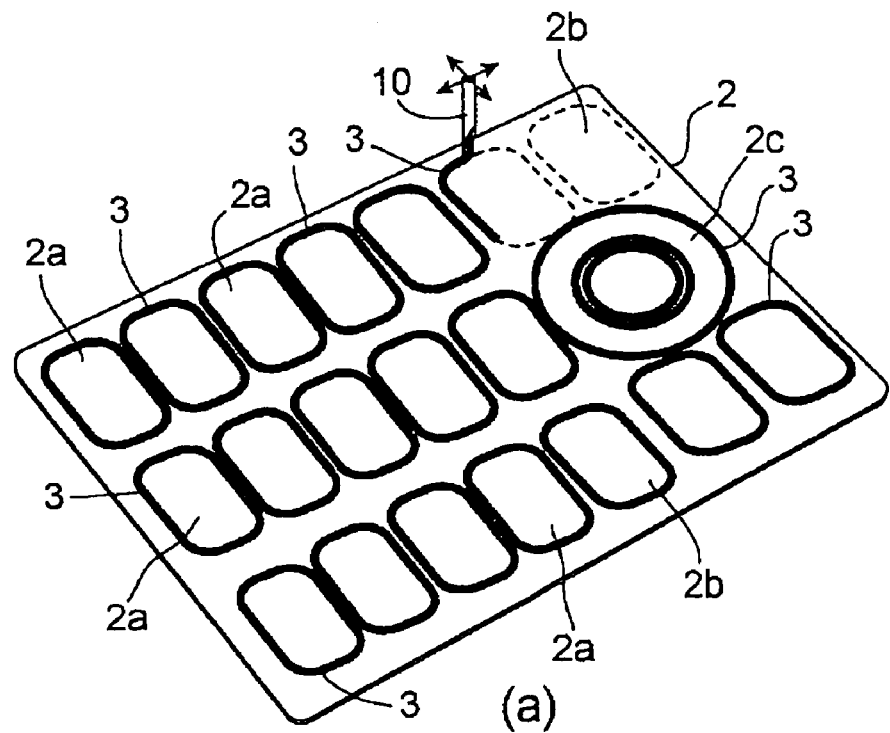
FIG. 5 is a perspective view showing a state where cushion gaskets are attached to a plurality of predetermined parts on the back surface of a key top, in Embodiment 1 of a thin key sheet in accordance with the present invention.
Figure 5:
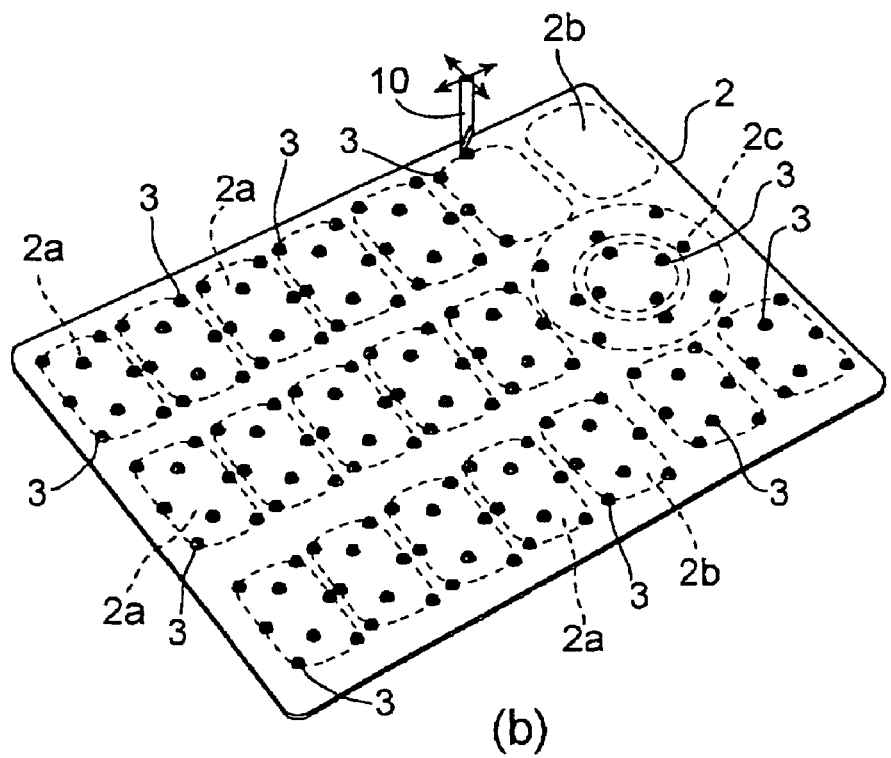
Figure 6:
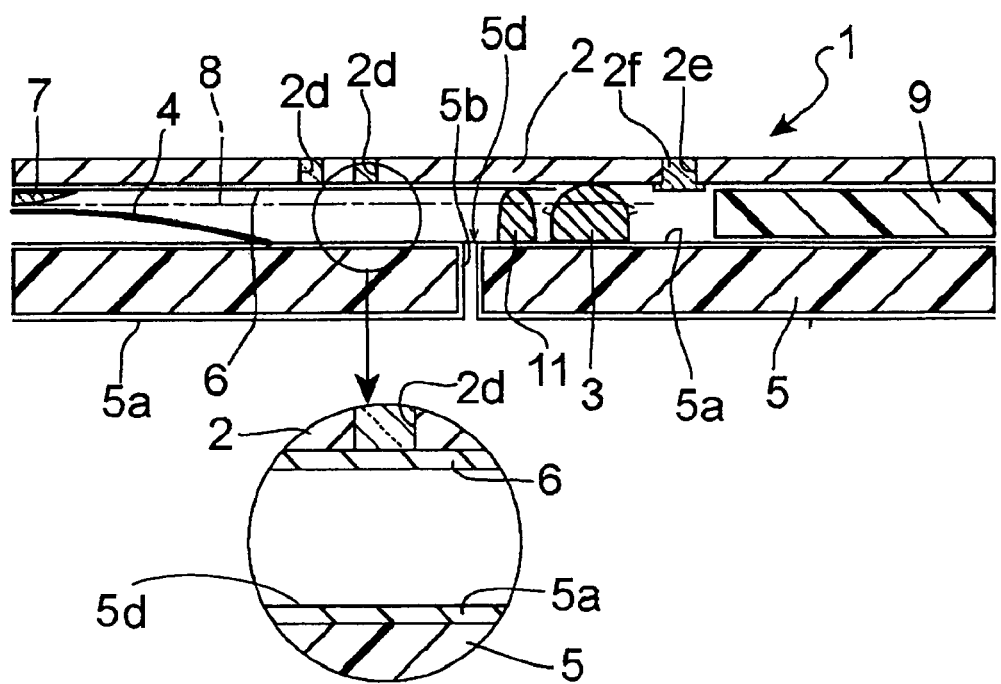
FIG. 6 is an enlarged sectional view showing the structure of Embodiment 1 of a thin key sheet in accordance with the present invention.

FIGS. 1 to 6 show Embodiment 1 of a thin key sheet of the present invention. As shown in FIGS. 2, 3 and 6, a key unit of the present Embodiment comprises a key sheet 1 which is configured from a key top 2 made of a thin metal plate such as stainless steel or the like and integrally formed by assembling various keys 2a, 2b and 2c, and a gasket 3 disposed along the periphery for each key. Underneath the key sheet 1, a printed circuit board 5 formed of a resin is closely disposed.

In FIG. 6, a dashed line 8 extending transversely shows a position to which, when the key top 2 is pressed, the bottom of the key top 2 is pressed down against the elasticity of the gasket 3 and metal dome 4. When the key top 2 is pressed down to the position of the dashed line 8, the metal dome 4 short-circuits between two normally open contacts (drawing omitted) disposed on the printed circuit board 5 by being pressed by a pressing element 7 on the back surface of the key top 2. Thereby, an electric circuit is to be completed only during the time when the key top 2 is pressed. Further, indicated by 9 is a spacer for supporting the key top 2 at its periphery.

As shown in FIGS. 1 to 3 and 6, in order to illuminate alphabets, symbols and/or numerals or the like each indicating the functions of each of the keys 2a, 2b and 2c, the key top 2 is provided with perforated openings 2d matched with the shapes of alphabets, symbols and/or numerals or the like by perforating a metal plate constituting a key top 2 from the front surface to the back surface. These perforated openings 2d are, as shown in the partial enlarged illustration of FIG. 6, filled with an appropriate transparent resin 2f for water proof and dust proof. Further, the key top 2 is provided with scores 2e in such a manner as to correspond to the areas for each of the keys 2a, 2b and 2c to separate them.

As shown in FIG. 6, a score 2e perforates a metal plate constituting the key top 2 from the front surface to the back surface. Thereby, each of the keys 2a, 2b and 2c is in a state to be connected to others only via one end, so that the connected part approximately functions as an hinge, allowing each of the keys 2a, 2b and 2c to easily move up and down when 2c is pressed. Further, for the purpose of water proof and dust proof, each of the score line 2e is filled with an appropriate resin 2f which only adheres partially so as not to prevent the movement of each of the keys 2a, 2b and 2c (see FIG. 6).

As a light source for transparent illumination, an EL (Electro-luminescence) element 6 is formed on the back surface of each of the keys 2a, 2b and 2c of the key top 2 by means of printing.

On the back surface of the key top 2 or on the front surface of the printed circuit board 5, the gasket 3 is formed linearly or in a dotted manner in a desired pattern by using a dispenser 10 or screen printing (when the thickness is 0.3 mm or less) so as to correspond to the position of each of the keys 2a, 2b and 2c (see FIGS. 4 and 5). Through this gasket 3, the key top 2 is disposed and fixed directly on the printed circuit board 5. Conventional key pads will become unnecessary by adopting such configuration, then it allows configuration thinner than that using a key pad.

As shown in FIGS. 4 and 5, the gasket 3 is adhered to the back surface of the key top 2 or the printed circuit board 5 by being supplied from a dispenser 10 or the like. As the gasket 3, it is desirable to use a material which has a property of a fluid being easy to flow when supplying it using a dispenser 10, and a property of uncollapsibility of the shape despite its flow when adhering it to the back surface of the key top 2 or the printed circuit board 5, i.e. a material which has thixotropy. Further, it is desirable to use a material which quickly dries and is solidified due to the aerification of a solvent, the radiation of ultraviolet ray, heating or the like.

As a material for the gasket 3, any material with adhesion and rubber-like elasticity in addition to the above-mentioned characteristics might be appropriately selected and adopted. For example, it is possible to use various resin foams such as foamed urethane resin or the like, silicone-based or urethane acrylate-based resin or the like. Further, it is also possible to use "Composition for a gasket" set forth in the invention filed by the present applicant jointly with other applicants (Composition for a gasket and process for producing a gasket using the composition: International Publication No. WO96/10594, Korean Patent No. 235841, Chinese Patent No. 95195961, Singaporean Patent No. 39208, U.S. Pat. No. 5,945,463 and Japanese Patent Application No. Hei 8-511615) which is herein exemplified.

FIG. 4 shows a sectional view the working state in which a material of the gasket 3 is adhered to a predetermined part corresponding to each of the keys 2a, 2b and 2c of the key top 2 on the surface of the printed circuit board 5 via the dispenser 10. FIG. 4(a) shows a state in which the gasket is linearly adhered to the inside of each key area indicated by a broken line so as to match its outer shape, and FIG. 4(b) shows a state in which the gasket is adhered in a dotted manner at appropriate intervals so as to match each key area. Further, FIGS. 5(a) and 5(b) show in their perspective views the working state in which a material of the gasket 3 is adhered to the inside of each of the keys 2a, 2b or the like, along their outer shape lines, on the back surface that is reversed side of the key top 2.

As shown in FIG. 6, in a condition where the gasket 3 is adhered to the back surface of the key top 2, it maintains a raised state to some extent without collapsibility of its shape due to its flow, leading to solidification while maintaining its shape, so that a predetermined cushioning property is maintained. Further, when the gasket 3 is adhered linearly, as shown in FIGS. 4(a) and 5(a), a part thereof may be scored to provide appropriate gaps which can be an air relief part associated with key pressing. When these gaps are not provided, a through hole on the printed circuit board 5 can be the similar air relief part.

A wiring means to the individual EL elements 6 for supplying power for illumination is not particularly limited. For example, as shown in FIG. 6, it is acceptable to adopt the structure in which a contact projection 11 is provided by means of conductive rubber or the like at an appropriate location of a printed wiring 5a on the printed circuit board 5, so that the upper end of the contact projection 11 is always in contact with the contact of the EL element 6.

In the case of the thin key sheet 1 shown in the above-mentioned Embodiment 1, it becomes possible to use as a metal top 2 a metal plate with a thickness of 0.2 mm, and in addition it becomes possible to set the thickness of the combination of the metal plate and a metal dome 4 with a thickness of 0.2 to 0.3 mm plus the thickness of the contact pressing projection 7, thereby making the thickness from the surface of the key top 2 to the surface of the printed circuit board 5 about 0.65 mm.

Further, since the key top 2 in the key sheet 1 and the key top 2 in a key sheet 1B mentioned below have a structure of pressing a metal dome by utilizing elasticity of a metal plate, it is desirable that the key top 2 should be thinner to some extent. However, if it becomes too thin, it will be deformed and not be restored to its original shape when some stress is applied to the key top 2. Therefore, the thickness of about 0.2 mm is desirable under current situation. However, if a material to solve the problem of the deformation due to stress is available, the thickness of 0.1 mm can be achieved.

Embodiment 2

Figure 8:
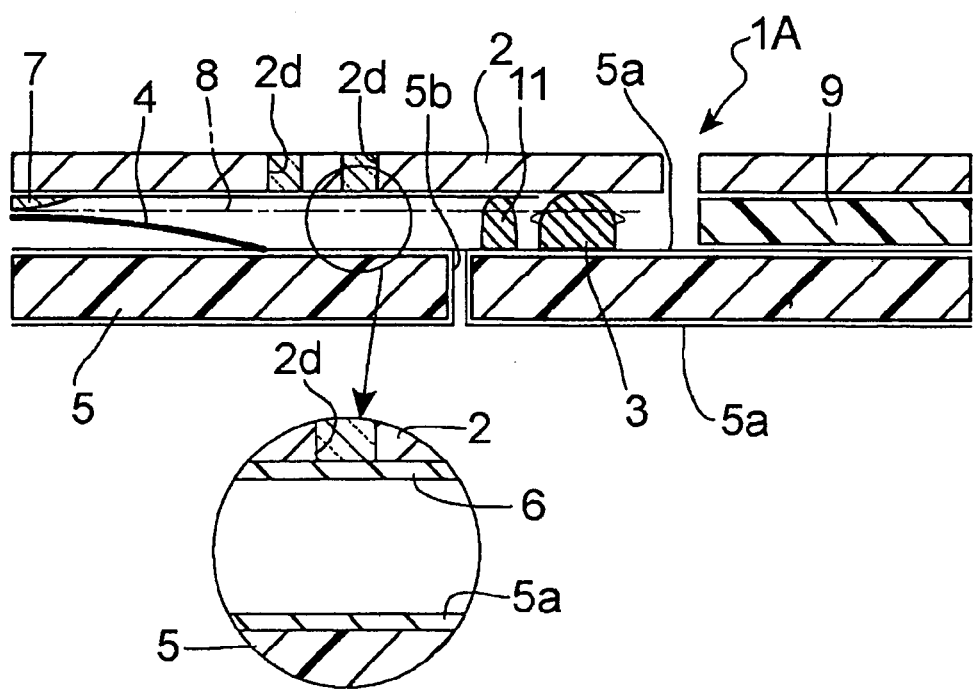
FIG. 8 is an enlarged sectional view showing the structure of Embodiment 2 of a thin key sheet in accordance with the present invention.

FIGS. 7 and 8 show Embodiment 2 of the thin key sheet of the present invention. As shown in FIG. 7, the thin key sheet 1A of the present Embodiment 2 comprises ten-keys 2a on which alphabets, symbols and/or numerals are respectively indicated, function keys 2b to which the functions such as power ON/OFF, the cutting of a line, e-mail or the like are allocated, and a cursor key 2c at the upper central part, and a plurality of those keys, working as a push button, are each separately formed as a plurality of key tops 2.

There is a structure in which the key tops 2 move upward and downward separately and independently corresponding to each of the keys 2a, 2b and 2c. Further, while it is not an essential configuration, a key frame 12 which is fixed onto the printed circuit board 5 with a spacer 9 being interposed so as to surround the periphery of the key top 2. Since the configuration of a key sheet 1A other than those mentioned above basically has the configuration similar to the key sheet 1, descriptions are omitted for the parts with the similar configuration by using the same symbols as those used for the descriptions of the key sheet 1.

Embodiment 3

FIG. 9 shows Embodiment 3 of the thin key sheet of the present invention. The key sheet 1B of Embodiment 3 has a structure of eliminating the scores 2e provided on the key top 2 of the key sheet 1 in the above-mentioned Embodiment 1 and corresponding to the areas of each of the keys 2a, 2b and 2c so as to separate them, and a structure of allowing the up-and-down movement which can press a metal dome only by the elasticity of the metal plate constituting the key top 2.

Consequently, the key top 2 of the key sheet 1B is set to 0.2 mm, in the same manner as the above-mentioned key top 2 of the key sheet 1, so that there does not occur the problem of deformation, being not restored to its original shape when stress is applied. Since the configuration of a key sheet 1B other than those mentioned above basically has the configuration similar to the key sheet 1, descriptions are omitted for the parts with the similar configuration by using the same symbols as those used for the descriptions of the key sheet 1.

Embodiment 4

Figure 10:
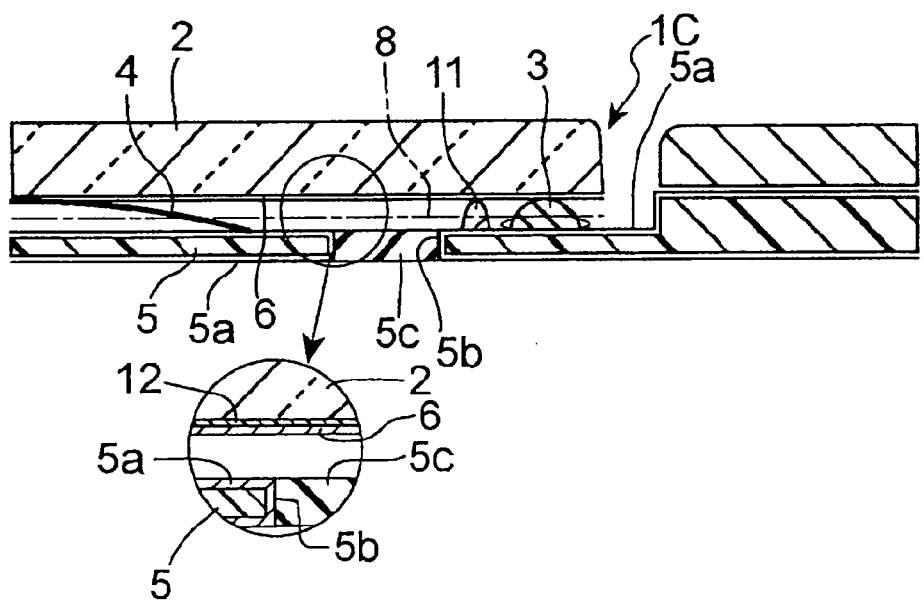
FIG. 10 is an enlarged sectional view showing the structure of Embodiment 4 of a thin key sheet in accordance with the present invention.
Figure 11:
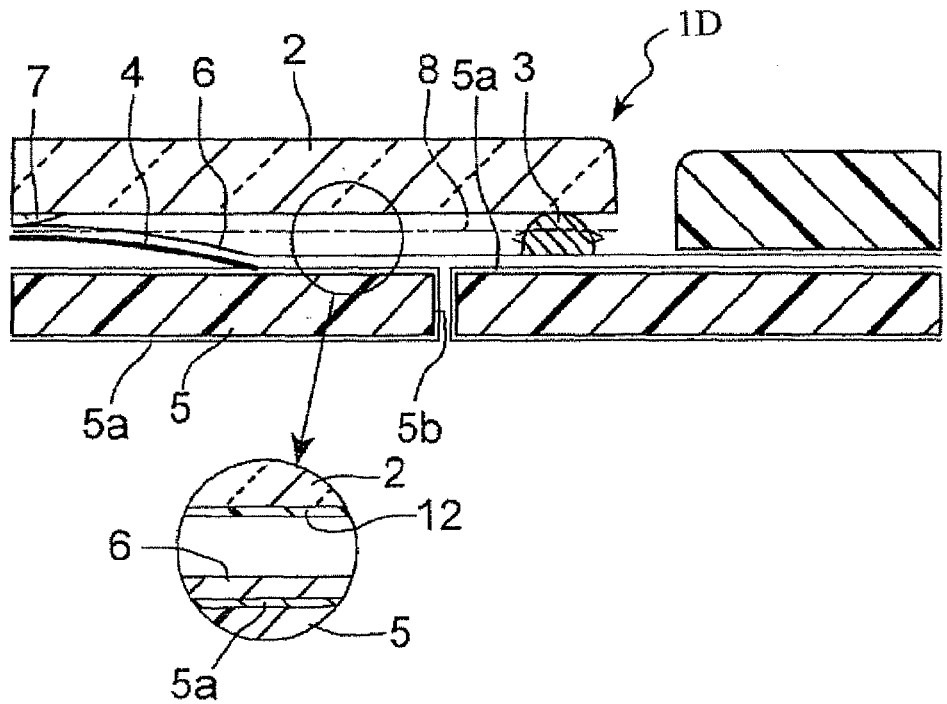
FIG. 11 is an enlarged sectional view showing the structure of a modified example of Embodiment 4 of a thin key sheet in accordance with the present invention.

FIGS. 10 and 11 show Embodiment 4 and its modified example of the thin key sheet of the present invention. The key sheet 1C of the present Embodiment 4 has a basic configuration approximately similar to the key sheet 1A in Embodiment 2 in which the key sheet 1C has a key top 2 comprising ten-keys 2a on which each of alphabets, symbols and/or numerals is indicated, function keys 2b to which the functions such as power ON/OFF, the cutting of a line, e-mail or the like are allocated, and a cursor key 2c at the upper central part, and a plurality of those keys, working as push buttons, are each separately formed as a plurality of key tops 2. Each key top 2 is formed of a transparent hard resin such as polycarbonate resin, acrylic hard resin or the like.

Along with this, on the back surface of each key top 2, a letter-printed layer 12 in positive or in negative is formed, and an EL element 6 is formed in such a manner as to cover the letter-printed layer 12. Light irradiated from this EL element 6 illuminates various letters or the like indicating the functions of keys formed on the letter-printed layer 12. The wiring pattern 5a of the printed circuit board 5 is connected by a through hole 5b filled with conductive rubber or conductive ink 5c on the front and the back. An item shown in FIG. 11 is a modified example 1D of the key sheet 1C. As shown in the key sheet 1D, it is also possible to adopt a through hole 5b which simply has an opening instead of the structure to couple the wiring patters 5a on the front and the back in the printed circuit board 5.

The appearances of the key sheets 1C and 1D of the Embodiment 4 are approximately the same as the key sheet 1A shown in FIG. 7. Since the configuration of the key sheets 1C and 1D other than those mentioned above basically has the configuration similar to the key sheets 1 and 1A or the like, descriptions are omitted for the parts with the similar configuration by using the same symbols as those used for the descriptions of the key sheet 1. Further, when the key top 2 is made of a resin, it is acceptable to apply an appropriate decoration for forming a hue of the appearance, letters or the like on its surface (the top surface and the side surface, exposed to the outside) by means of painting or the like instead of forming the letter-printed layer 12 on the back surface.

Embodiment 5

Figure 12:
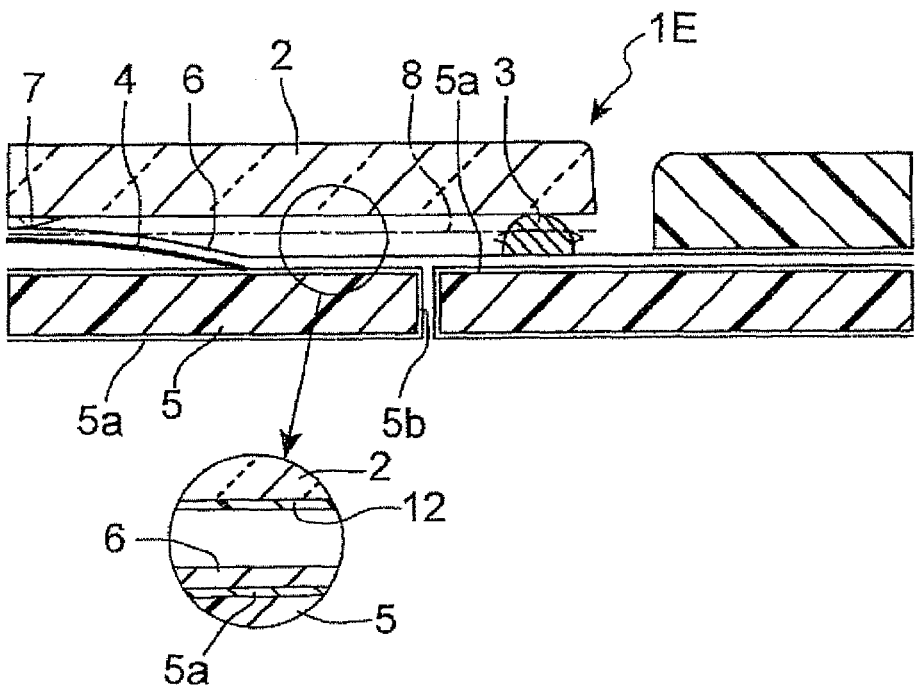
FIG. 12 is an enlarged sectional view showing the structure of Embodiment 5 of a thin key sheet in accordance with the present invention.
Figure 13:
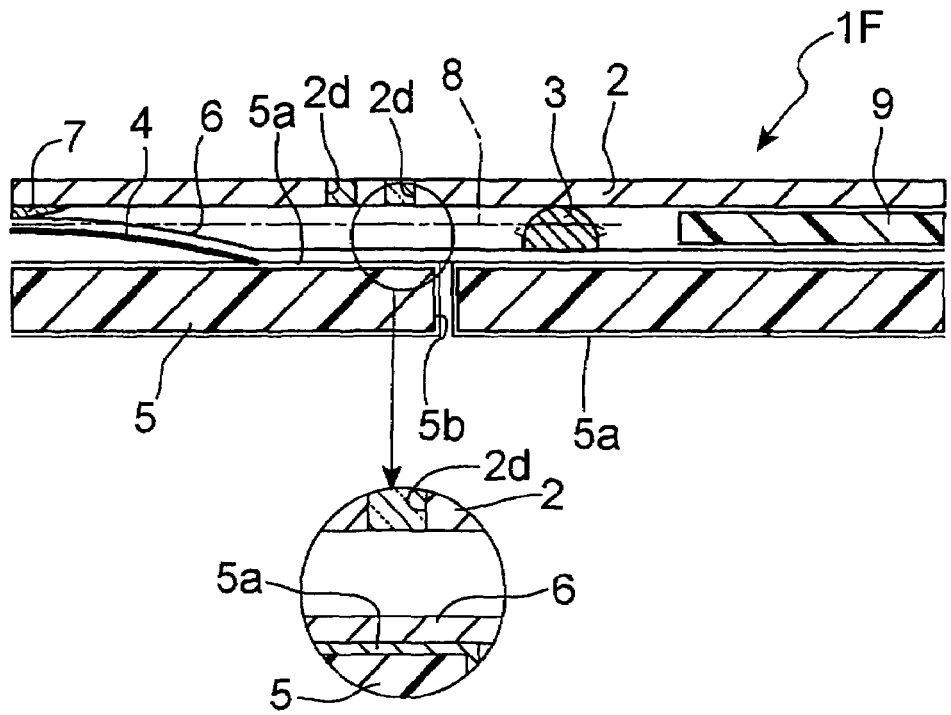
FIG. 13 is an enlarged sectional view showing the structure of a modified example of Embodiment 5 of a thin key sheet in accordance with the present invention.
Figure 14:
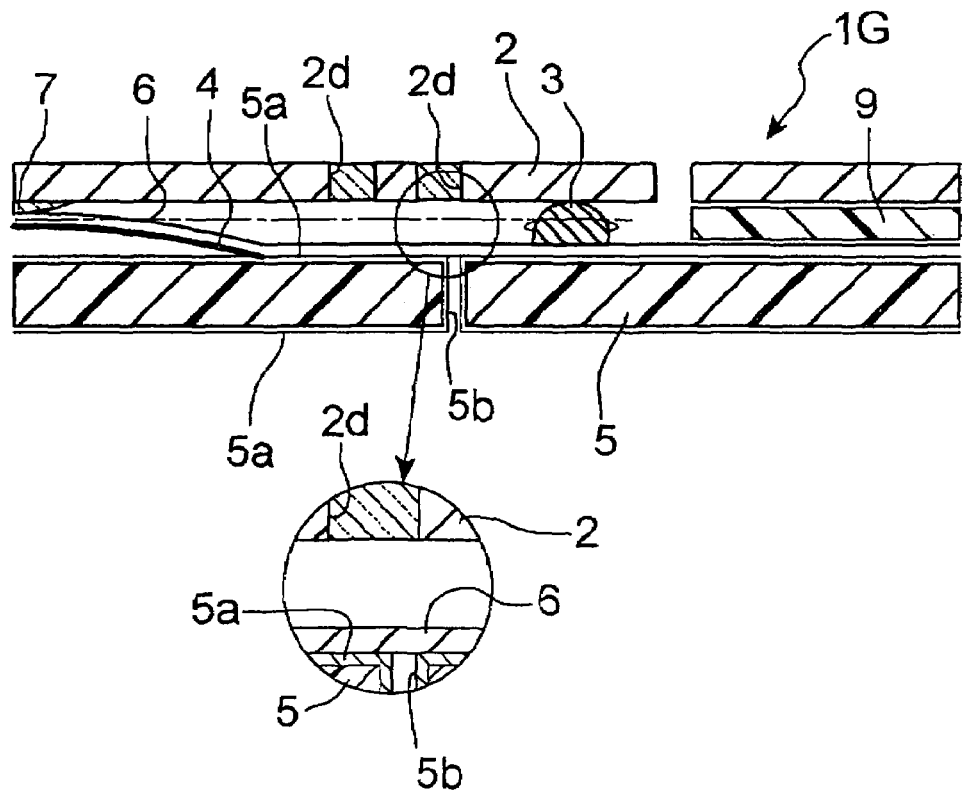
FIG. 14 is an enlarged sectional view showing the structure of another modified example of Embodiment 5 of a thin key sheet in accordance with the present invention.

FIGS. 12 to 14 show Embodiment 5 and its two modified examples of the thin key sheet of the present invention. In the same manner as each Embodiment mentioned above, the key sheet 1E and its modified examples 1F and 1G of the present Embodiment 5 have an integral key top 2 made of a metal (or separate key tops 2 made of a metal or a resin) comprising ten-keys 2a on which alphabets, symbols and/or numerals are indicated, function keys 2b to which the functions such as power ON/OFF, the cutting of a line, e-mail or the like are allocated, and a cursor key 2c at the upper central part, and a plurality of those keys, working as push buttons, are integrally formed. A letter-printed layer 12 in positive or negative is formed on the back surface of each key top 2 of the key sheet 1E shown in FIG. 12. A perforated opening 2d formed in the shape of letters or the like is provided on the key sheets 1F and 1G shown in FIGS. 13 and 14.

In these key sheets 1E, 1F and 1G, the EL element 6 is not formed by means of printing on the back surface of each key top 2, but a sheet-like element formed on a film made of a resin by means of printing is disposed in such a manner as to cover the surface of the printed circuit board 5 and the metal dome 4. The appearance of each of the key sheets 1E, 1F and 1G is approximately the same as the key sheet 1A or 1B shown in FIGS. 7 and 9. Since the configuration of the key sheets 1D, 1E and 1F other than those mentioned above basically has the configuration similar to the key sheets 1 and 1A or the like, descriptions are omitted for the parts with the similar configuration by using the same symbols as those used for the descriptions of the key sheet 1.

As described hereinbefore, in the thin key sheet of the present invention, the key top is made of a resin or a metal plate such as stainless steel or the like. Thereby, the limited thickness of the key top 2 is 0.6 mm (entire thickness: 1.05 mm) in the case of a resin, and about 0.2 mm (0.1 to 0.3 mm/entire thickness: 0.75 mm or 0.65 mm) in the case of stainless steel. Therefore, it becomes possible to set the thickness from the surface of the key top to the surface of the board to 0.6 to 1.1 mm.

The wiring to the EL element 6 used as a light source for illuminating letters or the like indicating the function of each of the keys 2a, 2b and 2c is carried out by forming a copper wiring pattern on the printed circuit board 5, so that an EL-integrated thin key sheet is configured. When the key top 2 is made of a metal, perforated openings in the shape of letters may be opened in order to be an illumination type by means of the etching or an appropriate method.

When a key top is made of a metal, it is possible to integrate all the key tops to achieve a sealed structure sandwiched by the key tops and the circuit board (see FIGS. 2 and 9). A metal plate is not limited to stainless steel. A metal having appropriate elasticity would be sufficient.

It is desirable to configure a thin key sheet in such a manner as to configure a key sheet module as a key unit integrally assembled together with the printed circuit board (PCB) 5 or the like.

A metal dome 4 is interposed between the undersurface of the key top 2 and the printed circuit board 5. The metal dome 4 is made of a material having conductivity and shape memory capacity such as phosphor bronze, which name is derived from its dome-like shape. The metal dome 4 does not always need to have such dome-like shape. It is sufficient for the metal dome 4 to have a shape and a structure in which: when the key top 2 is pressed down, normally open contacts are closed for certain; and when the key top 2 is not pressed down, the metal dome 4 can be restored to its original shape. When a specific key top 2 is pressed down, the metal dome 4 functions to close, in response to the press-down movement of the metal dome element, normally open contacts printed-wired on the printed circuit board 5 disposed therebelow so as to form an electric circuit.

Decorations including letters, symbols or the like which indicate the function of each key are applied to the top surface or the undersurface of the key top 2 by means of various arbitrary decoration methods. Even when the key top is made of a metal, if not giving a metal-like appearance to the key sheet, various types of paintings can also be applied to its surface.

As mentioned above, after the metal domes 4 are disposed on the surface of the printed circuit board 5, in order to fix each metal dome 4 so as not to be scattered and lost from its position, an extremely thin sheet (e.g., a thin sheet such as polyethylene terephthalate film) is covered on the surface of the printed circuit board 5. An item diagrammatically shown in such a manner as to cover the hole of the thorough hole 5b as shown in FIG. 6 is the thin sheet 5d mentioned above. It should be understood that the thin sheet is also adhered to the top surface of the metal dome 4 in the same manner.

Embodiment 6

Figure 15:
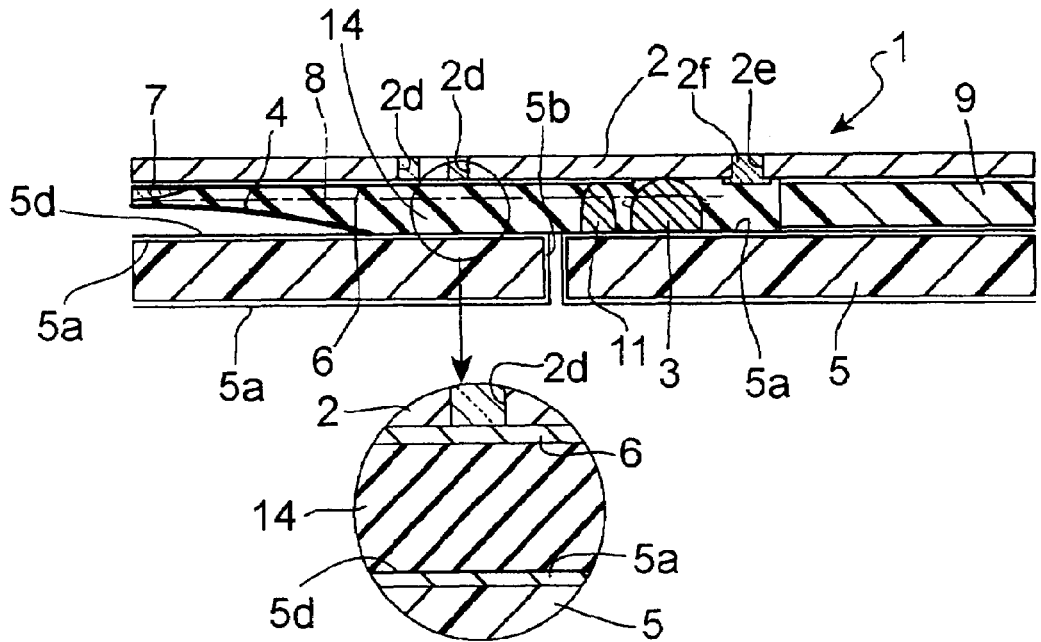
FIG. 15 is an enlarged sectional view showing the structure of Embodiment 6 after the filling of a foamed material or soft material of a thin key sheet in accordance with the present invention.

Next, a description is given to Embodiment 6 which is provided with a filler layer 14, with reference to FIG. 15. In Embodiments 1 to 5, as shown in the enlarged sectional views in FIGS. 6 and 8, the above-mentioned cushion gasket 3 has been provided on the top surface of the printed circuit board 5 (along the inside track of the periphery on the back surface of each key top 2) in a state of "continuous bank" (see FIG. 5). Thereby, there has been generated a surrounded space between the above-mentioned key top 2 and the printed circuit board 5 disposed therebelow. Since contact projections 11 are scattered over, no surrounded space is generated. The surrounded space is formed by being surrounded by the gasket 3, the thin film EL light source element 6 attached to the undersurface of the key top 2, and the above-mentioned extremely thin sheet 5d adhered to the top surface of the printed circuit board 5 together with the metal dome 4.

The surrounded space is filed with a foamed material or a soft material. The filler layer 14 after filling is shown in FIG. 15. As a foamed material or a soft material is to be used, a material having flexibility and shape restorability is necessary, and thus, for example, silicone-based or urethane acrylate-based foamed materials or various soft elastomers are desirable. Specifically illustrated, soft foamed materials such as foamed urethanes or the like are desirable. The filler layer 14 of a foamed material or a soft material is thus disposed below the key top, thinner configuration was achieved while enhancing a key click feel.

The above-mentioned foamed material or a soft material does not always need to be provided by means of filling, but a thin sheet of a foamed material or a soft material may be inserted into the above-mentioned surrounded space. Further, the cushion gasket 3 does not always need to be provided.

Embodiment 7

Figure 16:
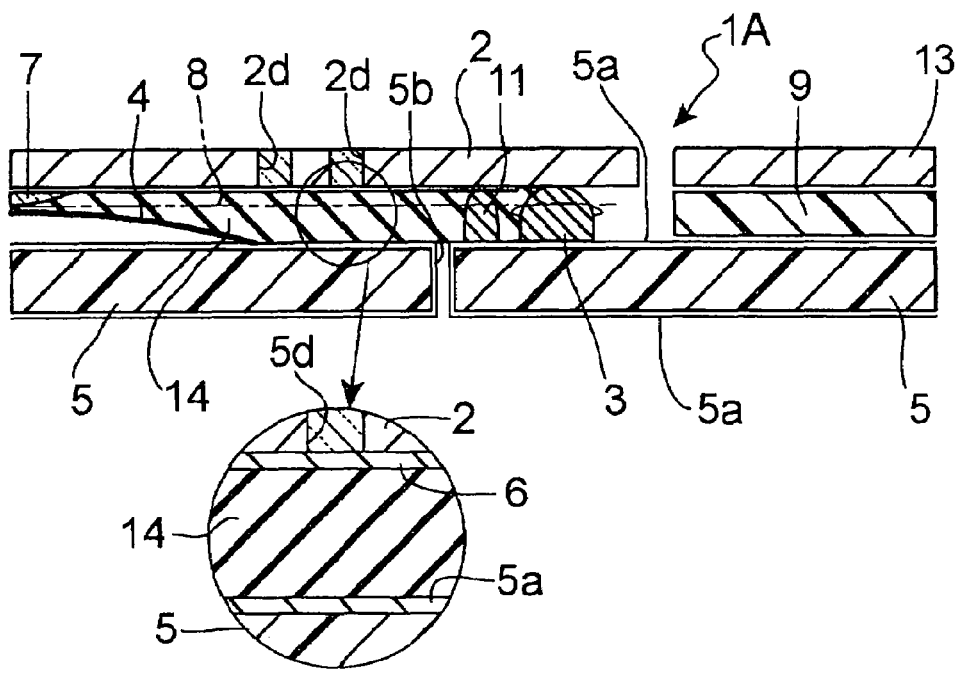
FIG. 16 is an enlarged sectional view showing the structure of Embodiment 7 with a foamed material or soft material filled of a thin key sheet in accordance with the present invention.

FIG. 16 shows Embodiment 7 of the thin key sheet of the present invention. The thin key sheet 1A of the present Embodiment 7 comprises ten-keys 2a on which alphabets, symbols and/or numerals are each indicated, function keys 2b to which the functions such as power ON/OFF, the cutting of a line, e-mail or the like are allocated, and a cursor key 2c at the upper central part, and a plurality of those keys, working as push buttons, are each separately formed as a plurality of key tops 2. The key tops 2, 2 have a structure of moving upward and downward separately and independently for each of the keys 2a, 2b and 2c.

Further, while it is not an essential configuration, a key frame 13 which is fixed onto the printed circuit board 5 with a spacer 9 being interposed so as to surround the periphery of the key top 2.

The gasket 3 is attached to the to surface of the printed circuit board 5 on which the wiring pattern 5a is provided. The gasket 3 maintains a raised state to some extent as shown diagrammatically, without collapsibility of the shape due to its flow, and solidified with keeping its shape, so that a predetermined cushioning property is maintained. The gasket 3 is provided along the inside track of the periphery on the back surface of the ten-keys 2a (see FIG. 3) in a state of "continuous bank" (see FIG. 5), thereby generating a space between the above-mentioned key top 2 and the printed circuit board 5 disposed therebelow, and the space is therefore filled with the filler layer material 14 of a foamed material or a soft material in the same manner as the above-mentioned Embodiment 1. Otherwise, instead of providing the gasket 3 on the printed circuit board 5, a sheet of a foamed material or a soft material formed in a predetermined shape, in place of the filler layer 14, may be inserted and disposed in the above-mentioned space.

Since the configuration of a key sheet 1A other than those mentioned above basically has the configuration similar to the key sheet 1, descriptions are omitted for the parts with the similar configuration by using the same symbols as those used for the descriptions of the key sheet 1.

Embodiment 8

The appearance of Embodiment 8 of the thin key sheet of the present invention is the same as FIG. 9. The key sheet 1B (see FIG. 9) of Embodiment 8 has a structure of removing scores 2e (see FIGS. 1 to 3) which is provided on the key top 2 of the key sheet 1 in the above-mentioned Embodiment 1 for corresponding to the areas of each of the keys 2a, 2b and 2c so as to separate them, and of allowing up-and-down-movement capable of pressing a metal dome by means of only the elasticity of the metal plate which constitutes the key top 2. The filler layer 14 (diagrammatical representation omitted) is provided also between the key top 2 of the key sheet 1B and the printed circuit board 5 of the present Embodiment.

Thus, the thickness of the key top 2 of the key sheet 1B was set to 0.2 mm, in the same manner as the above-mentioned key top 2 of the key sheet 1, so that there does not occur the problem of deformation, not being restored to its original shape when stress is applied. Since the configuration of a key sheet 1B other than those mentioned above basically has the configuration similar to the key sheet 1, descriptions are omitted for the parts with the similar configuration by using the same symbols as those used for the descriptions of the key sheet 1.

Embodiment 9

Figure 17:
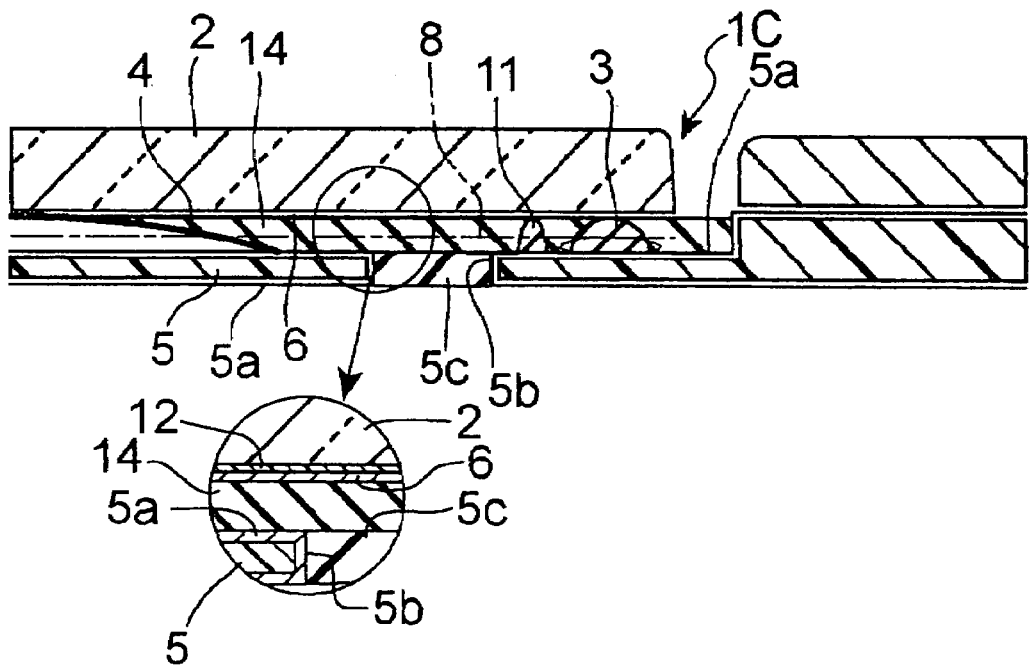
FIG. 17 is an enlarged sectional view showing the structure of Embodiment 8 with a foamed material or soft material filled of a thin key sheet in accordance with the present invention.
Figure 18:
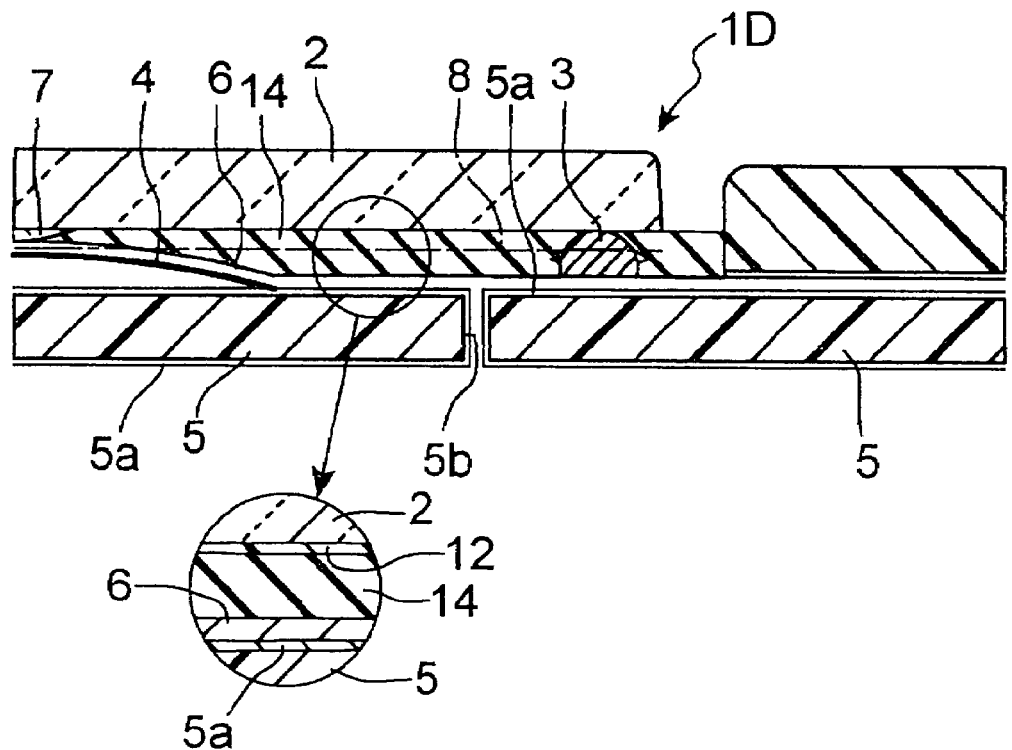
FIG. 18 is an enlarged sectional view showing the structure of a modified example of Embodiment 9 with a foamed material or soft material filled of a thin key sheet in accordance with the present invention.

FIGS. 17 and 18 show Embodiment 9 and its modified example of the thin key sheet of the present invention. The key sheet 1C of the present Embodiment 9 has approximately the same basic configuration as the key sheet 1A in Embodiment 7, and comprises ten-keys 2a on which alphabets, symbols and/or numerals are indicated, function keys 2b to which the functions such as power ON/OFF, the cutting of a line, e-mail or the like are allocated, and a cursor key 2c at the upper central part, and a plurality of those keys, working as push buttons, are each separately formed as a plurality of key tops 2. Each key top 2 is formed of a transparent hard resin such as polycarbonate (PC) resin, polyacryl resin (PMMA) or the like.

Along with this, on the back surface of each key top 2, a letter-printed layer 12 in positive or in negative is formed, and an EL element 6 is formed in such a manner as to cover the letter-printed layer 12. Light irradiated from this EL element 6 illuminates various letters or the like indicating the functions of keys formed on the letter-printed layer 12. The wiring pattern 5a of the printed circuit board 5 is connected by a through hole 5b filled with conductive rubber or conductive ink 5c on the front and the back. An item shown in FIG. 18 is a modified example 1D of the key sheet 1C. As shown in the key sheet 1D, it is also possible to adopt a through hole 5b which simply has an opening instead of the structure to couple the wiring patters 5a on the front and the back in the printed circuit board 5. Further, when the key top 2 is made of a transparent hard resin, it is also possible to provide the above-mentioned letter-printed layer 12 on the surface (top surface) instead of the back surface of the key top 2 (also the same in Embodiments mentioned below).

In FIG. 17, the filler layer 14 is formed by filling or impregnating a foamed material or a soft material into a concave portion on the top surface of the printed circuit board 5. The details of the state of the filler material layer 14 is shown in the partially enlarged sectional view within a circle.

The foamed material or soft material constituting the above-mentioned filler layer 14 do not always need to be provided by means of filling or impregnation, but a thin sheet of a foamed material or a soft material may be inserted into the above-mentioned concave portion. In this case, the gasket 3 does not always need to be provided.

The appearances of the key sheets 1C and 1D of the Embodiment 9 are approximately the same as the key sheet 1A shown in FIG. 7. Since the configuration of the key sheets 1C and 1D other than those mentioned above basically has the configuration similar to the key sheets 1 and 1A or the like, descriptions are omitted for the parts with the similar configuration by using the same symbols as those used for the descriptions of the key sheet 1. Further, when the key top 2 is made of a resin, it is acceptable to apply an appropriate decoration for forming a hue of the appearance, letters or the like on its surface (the top surface and the side surface exposed to the outside) by means of painting or the like, instead of forming the letter-printed layer 12 on the back surface.

Embodiment 10

Figure 19:
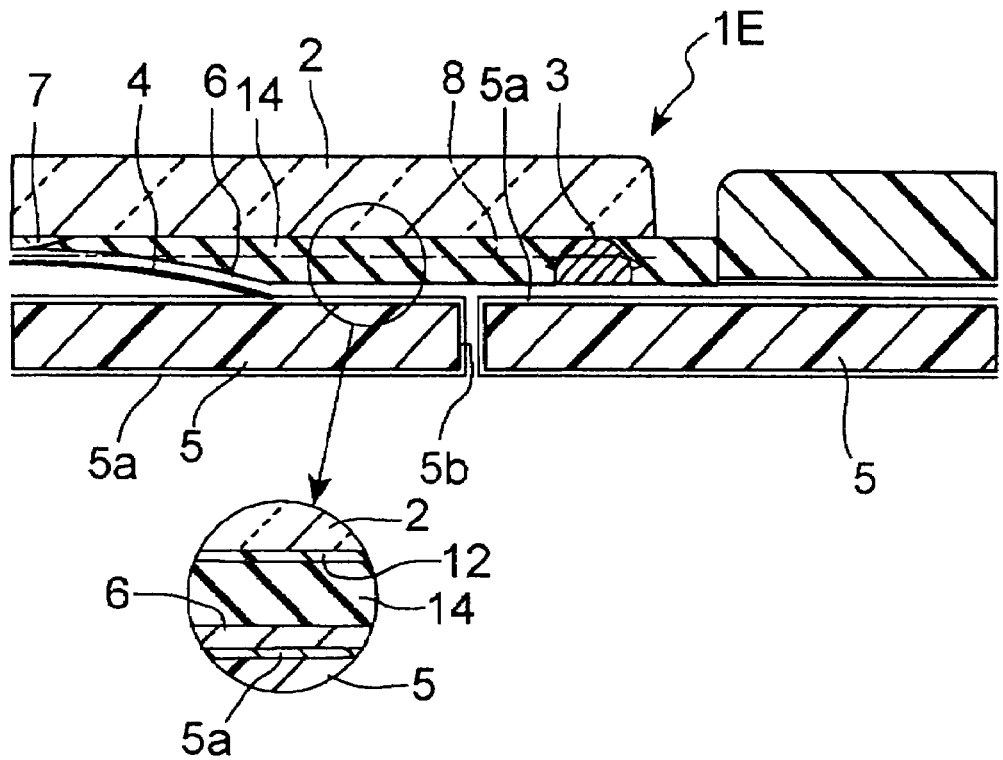
FIG. 19 is an enlarged sectional view showing the structure of Embodiment 10 with a foamed material or soft material filled of a thin key sheet in accordance with the present invention.
Figure 20:
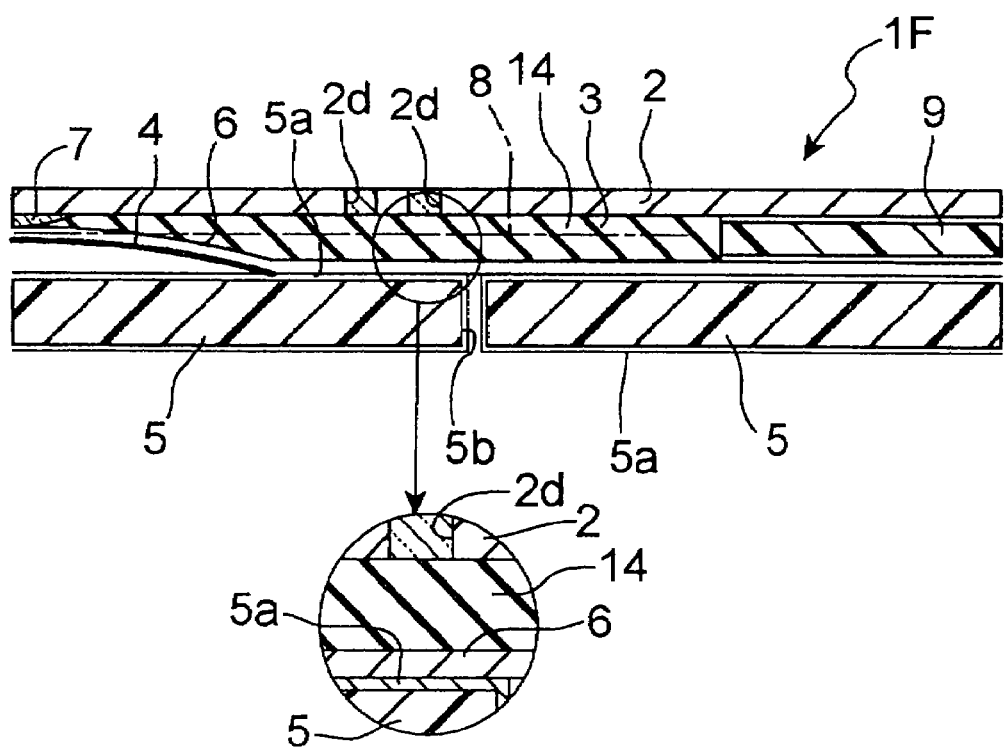
FIG. 20 is an enlarged sectional view showing the structure of a modified example (without gaskets, and with a foamed material or soft material filled) of Embodiment 10 of a thin key sheet in accordance with the present invention.
Figure 21:
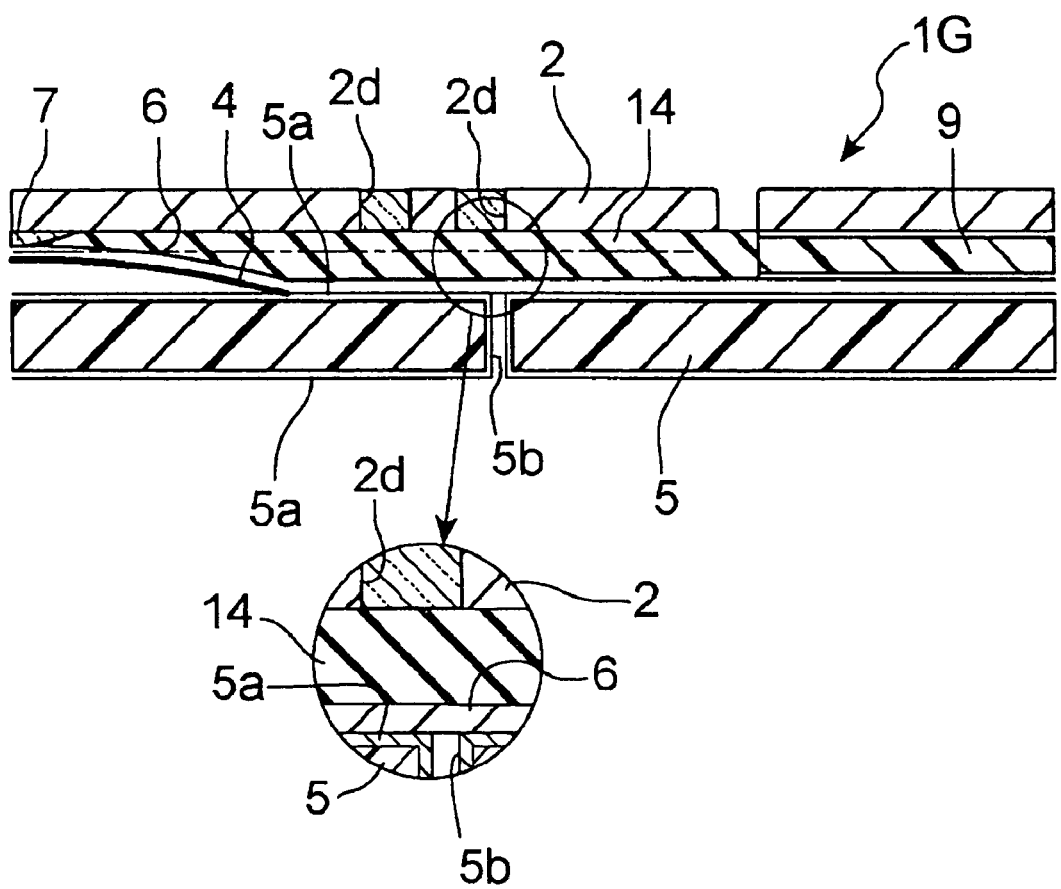
FIG. 21 is an enlarged sectional view showing the structure of another modified example (without gaskets, and with a foamed material or soft material filled) of Embodiment 10 of a thin key sheet in accordance with the present invention.

FIGS. 19 to 21 show Embodiment 5 and its two modified examples of the thin key sheet of the present invention. In the same manner as each Embodiment mentioned above, the key sheet 1E and its modified examples 1F and 1G of the present Embodiment 10 have an integral key top 2 made of a metal (or separate key tops 2 made of a metal or a resin) comprising ten-keys 2a on which alphabets, symbols and/or numerals are indicated, function keys 2b to which the functions such as power ON/OFF, the cutting of a line, e-mail or the like are allocated, and a cursor key 2c at the upper central part, and a plurality of those keys, working as push buttons, are integrally formed.

A letter-printed layer 12 in positive or negative is formed on the back surface of each key top 2 made of a transparent resin of the key sheet 1E shown in FIG. 19. A perforated opening 2d formed in the shape of letters or the like is provided on the key sheets 1F and 1G shown in FIGS. 20 and 21. In these key sheets 1E, 1F and 1G, the EL element 6 is not formed by means of printing on the back surface of each key top 2, but a sheet-like element formed on a film made of a resin by means of printing is disposed in such a manner as to cover the surface of the printed circuit board 5 and the metal dome 4.

Further, the key top 2 shown in FIG. 20 is integrally and widely formed with a plurality of keys being assembled, and thus extends over the spacer 9 present at the right end in FIG. 20. In this case, the filler layer 14 is filled into or laid in the concave portion flanked by the spacer 9 at the right end without the gasket.

Each of the appearances of the key sheets 1E, 1F and 1G is approximately the same as the key sheet 1A or 1B shown in FIGS. 7 and 9. Since the configuration of the key sheets 1D, 1E and 1F other than those mentioned above basically has the configuration similar to the key sheets 1 and 1A or the like, descriptions are omitted for the parts with the similar configuration by using the same symbols as those used for the descriptions of the key sheet 1.

As described hereinbefore, in the thin key sheet of the present invention, the key top is made of a resin or a metal plate such as stainless steel or the like. Thereby, the limited thickness of the key top 2 is 0.6 mm (entire thickness: 1.05 mm) in the case of a resin, and about 0.2 mm (0.1 to 0.3 mm/entire thickness: 0.75 mm or 0.65 mm) in the case of stainless steel. Therefore, it becomes possible to set the thickness from the surface of the key top to the surface of the board to 0.6 to 1.1 mm.

The wiring to the EL element 6 used as a light source for illuminating letters or the like indicating the function of each of the keys 2a, 2b and 2c is carried out by forming a copper wiring pattern on the printed circuit board 5, so that an EL-integrated thin key sheet is configured. When the key top 2 is made of a metal, perforated openings in the shape of letters may be opened in order to be an illumination type by means of or the etching or an appropriate method.

When a key top is made of a metal, it is possible to integrate all the key tops to achieve a sealed structure sandwiched by the key tops and the circuit board (see FIGS. 2 and 9). A metal plate is not limited to stainless steel. A metal having appropriate elasticity would be sufficient.

It is desirable to configure a thin key sheet in such a manner as to configure a key sheet module as a key unit integrally assembled together with the printed circuit board (PCB) 5, or the like.

A metal dome 4 is interposed between the undersurface of the key top 2 and the printed circuit board 5. The metal dome 4 is made of a material having conductivity and shape memory capacity such as phosphor bronze, which name is derived from its dome-like shape. The metal dome 4 does not always need to have such dome-like shape. It is sufficient for the metal dome 4 to have a shape and a structure in which: when the key top 2 is pressed down, normally open contacts are closed for certain; and when the key top 2 is not pressed down, the metal dome 4 can be restored to its original shape. When a specific key top 2 is pressed down, the metal dome 4 functions to close, in response to the press-down movement of the metal dome element, normally open contacts printed-wired on the printed circuit board 5 disposed therebelow so as to form an electric circuit.

As mentioned above, after the metal domes 4 are disposed on the surface of the printed circuit board 5, in order to fix each metal dome 4 so as not to be scattered and lost from its position, an extremely thin sheet (e.g., a thin sheet such as PET or the like) is covered on the surface of the printed circuit board 5. An item diagrammatically shown in such a manner as to cover the hole of the thorough hole 5b shown in FIG. 15 is the thin sheet 5d mentioned above. It should be understood that the thin sheet 5d is also adhered to the top surface of the metal dome 4 in the same manner.

When the key top 2 is made of a resin, decorations including letters, symbols or the like which indicate the function of each key are applied to the top surface or the undersurface by means of various arbitrary decoration methods. Even when the key top is made of a metal, if not used only for giving a metal-like appearance to the key sheet, various types of paintings can also be applied to its surface.

INDUSTRIAL APPLICABILITY

Since the present invention relates to a thin key sheet for use in mobile equipment such as portable phones, and personal digital assistants (PDA), it has a wide range of applicability in industrial fields seeking thinner configuration of these equipment provided with keys, including manufacturing industries of electronic equipment and the various components thereof.

The invention claimed is:

1. A thin key sheet comprising a single or a plurality of key top(s) made of a metal or a resin having indications including letters, symbols, graphics indicating the functions of keys, and a cushion gasket provided on a back surface of the key top;
   wherein the cushion gasket is formed by supplying an ultraviolet curing resin or a heat curing resin in a liquid state to the back surface of the key top using a dispenser or by printing; and
   wherein the cushion gasket is hardened after the key top is disposed on a printed circuit board, so that the key top and the printed circuit board are adhered together.

2. The thin key sheet according to claim 1, wherein the cushion gasket is formed linearly or in a dotted manner.

3. The thin key sheet according to claim 1, wherein pressing projections are formed by supplying a liquid resin to the back surface of the key top using a dispenser, or by printing, and subsequently hardened, in a position corresponding to switch elements on the printed circuit board.

4. A thin key unit comprising a single or a plurality of key top(s) made of a metal or a resin having indications including letters, symbols, graphics indicating the functions of keys, and a printed circuit board on which a circuit pattern for turning ON/OFF of an electric circuit by the pressing of the key top is formed, wherein the key top and the printed circuit board are adhered and fixed together by a cushion gasket interposed between the key top and the printed circuit board;
   wherein the cushion gasket is formed by supplying an ultraviolet curing resin or a heat curing resin in a liquid state to a front surface of the printed circuit board using a dispenser or by printing, and hardened after the key top is disposed on the printed circuit board, so that the key top and the printed circuit board are adhered together.

5. The thin key unit according to claim 4, wherein an EL light source comprising EL elements is formed on a back surface of the key top by means of printing as a light source for illuminating the letters, symbols, graphics indicating the functions of keys.

6. The thin key unit according to claim 5, wherein electric connections to an individual EL elements are achieved by the contact between a wiring pattern formed on the back surface of the key top by means of a film-forming method for metal thin films including deposition, sputtering and a contact projection made of conductive rubber provided on a wiring pattern of the printed circuit board.

7. The thin key unit according to claim 4, wherein an EL light source comprising EL elements arrayed on a resin film in a desired shape is provided on a back surface of the key top as a light source for illuminating indications including letters, symbols, graphics indicating the functions of keys.

8. The thin key unit according to claim 4, wherein a thickness of the key top is about 0.6 mm when made of a resin and 0.1 to 0.3 mm when made of a metal, and the thickness from a surface of the key top to a surface of the printed circuit board is 0.6 to 1.1 mm.

9. The thin key unit according to claim 4, pressing projections are formed by supplying a liquid resin to a back surface of the key top using a dispenser, or by printing, and subsequently hardened, in a position corresponding to switch elements on the printed circuit board.

10. The thin key unit according to claim 4, wherein the cushion gasket is formed linearly or in a dotted manner.

11. The thin key unit according to claim 4 or 10, wherein foamed materials are interposed between the key top and the printed circuit board disposed therebelow.

12. A thin key unit comprising a single or a plurality of key top(s) made of a metal or a ream having indications including letters, symbols, graphics indicating the functions of keys, and a printed circuit board on which a circuit pattern for turning ON/OFF of an electric circuit by a pressing of the key top is formed, wherein the key top and the printed circuit board are adhered and fixed together by a cushion gasket interposed between the key top and the printed circuit board;

wherein a cushion gasket is formed by supplying an ultraviolet curing resin or a heat curing resin in a liquid state to a back surface key top using a dispenser or by printing, and hardened after the key top is on the printed circuit board, so that the key top and the printed circuit board are adhered together.

13. The thin key unit according to claim 12, wherein the cushion gasket is formed linearly or in a dotted manner.

14. The thin key unit according to claim 12, wherein a thickness of the key top is about 0.6 mm when made of a resin and 0.1 to 0.3 mm when made of a metal, and a thickness from a surface of the key top to a surface of the printed circuit board is 0.6 to 1.1 mm.

15. The thin key unit according to claim 12, wherein pressing projections are formed by supplying a liquid resin to the back surface of the key top using a dispenser, or by printing, and subsequently hardened, in a position corresponding to switch elements on the printed circuit board.

16. The thin key unit according to claim 12, wherein a cushion gasket provided along an inside track of a periphery of the key top and foamed materials including foamed urethanes or soft elastomers are interposed between the key top and the printed circuit board disposed therebelow.

* * * * *